(12) United States Patent
Prestidge et al.

(10) Patent No.: US 8,700,351 B2
(45) Date of Patent: *Apr. 15, 2014

(54) DEACTIVATABLE MEASUREMENT APPARATUS

(71) Applicant: Renishaw PLC, Gloucestershire (GB)

(72) Inventors: Tim Prestidge, Bath (GB); Jonathan Paul Fuge, Bristol (GB); Stuart Kersten Campbell, Nailsworth (GB)

(73) Assignee: Renishaw PLC, Wotton-Under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/767,357

(22) Filed: Feb. 14, 2013

(65) Prior Publication Data

US 2013/0152418 A1  Jun. 20, 2013

Related U.S. Application Data

(63) Continuation of application No. 12/216,576, filed on Jul. 8, 2008, now Pat. No. 8,437,978.

(60) Provisional application No. 60/996,984, filed on Dec. 13, 2007.

(30) Foreign Application Priority Data

Jul. 26, 2007 (EP) .................................. 07252959

(51) Int. Cl.
*G01B 21/20* (2006.01)
*G01B 5/008* (2006.01)

(52) U.S. Cl.
CPC ...................................... *G01B 5/008* (2013.01)
USPC ............. 702/127; 702/155; 33/1 CC; 33/558

(58) Field of Classification Search
CPC ...................................................... G01B 5/008

USPC ............. 702/127, 155, 189, 57, 64, 69, 81–82, 702/85, 87, 90, 179

See application file for complete search history.

(56) References Cited

U.S. PATENT DOCUMENTS

| 4,153,998 A | 5/1979 | McMurtry |
| 4,370,721 A | 1/1983 | Berenberg et al. |

(Continued)

FOREIGN PATENT DOCUMENTS

| CN | 1450877 A | 10/2003 |
| EP | 0 293 036 A2 | 11/1988 |

(Continued)

OTHER PUBLICATIONS

Aug. 31, 2012 Office Action issued in Japanese Application No. 2008-193436 (with translation).

(Continued)

*Primary Examiner* — Mischita Henson
(74) *Attorney, Agent, or Firm* — Oliff PLC

(57) ABSTRACT

Measurement apparatus is described that comprises a measurement portion for acquiring object measurements and an output portion for outputting measurement data relating to the acquired object measurements. A deactivation portion is provided for inhibiting normal operation of the measurement apparatus such that output of the measurement data is prevented. The deactivation portion, in use, reads apparatus usage information from an apparatus usage module and inhibits normal operation of the measurement apparatus if said apparatus usage information fails to meet one or more predetermined criteria. The apparatus usage module may be provided as an integral part of the measurement apparatus or as a separate activation button. The measurement apparatus may comprise a measurement probe such as a touch trigger measurement probe.

17 Claims, 7 Drawing Sheets

(56) References Cited

U.S. PATENT DOCUMENTS

| | | | |
|---|---|---|---|
| 4,536,851 | A | 8/1985 | Germanton et al. |
| 5,222,304 | A | 6/1993 | Butler |
| 5,949,352 | A | 9/1999 | Ferrari |
| 6,308,089 | B1 | 10/2001 | Von Der Ruhr et al. |
| 6,631,353 | B1 | 10/2003 | Davis et al. |
| 7,048,687 | B1 | 5/2006 | Reuss et al. |
| 7,145,468 | B2 | 12/2006 | Collingwood et al. |
| 8,437,978 | B2 * | 5/2013 | Prestidge et al. .............. 702/127 |
| 2003/0179097 | A1 | 9/2003 | Collingwood et al. |
| 2004/0039502 | A1 | 2/2004 | Wilson et al. |
| 2004/0093495 | A1 | 5/2004 | Engel |
| 2005/0028609 | A1 | 2/2005 | Langemann et al. |
| 2006/0016087 | A1 | 1/2006 | Schopf |
| 2006/0161054 | A1 | 7/2006 | Reuss et al. |
| 2006/0250266 | A1 | 11/2006 | Collingwood et al. |
| 2006/0265894 | A1 | 11/2006 | Schroll |
| 2007/0033419 | A1 | 2/2007 | Kocher et al. |
| 2007/0038088 | A1 | 2/2007 | Rich et al. |
| 2007/0118397 | A1 | 5/2007 | Williams et al. |
| 2007/0125348 | A1 | 6/2007 | Aoki |

FOREIGN PATENT DOCUMENTS

| | | |
|---|---|---|
| JP | A-57-054814 | 4/1982 |
| JP | A-64-086796 | 3/1989 |
| JP | A 5-306908 | 11/1993 |
| JP | U-06-051910 | 7/1994 |
| JP | A-2000-506027 | 5/2000 |
| JP | A-2001-160106 | 6/2001 |
| JP | A-2001-296120 | 10/2001 |
| JP | A-2001-311616 | 11/2001 |
| JP | A-2004-508619 | 3/2004 |
| JP | A-2004-522961 | 7/2004 |
| JP | A-2004-233194 | 8/2004 |
| JP | A-2006-511860 | 4/2006 |
| JP | A-2009-008429 | 1/2009 |
| WO | WO 00/61003 | 10/2000 |
| WO | WO 02/17048 A2 | 2/2002 |
| WO | WO 02/063235 A2 | 8/2002 |
| WO | WO 03/021182 A1 | 3/2003 |
| WO | WO 2004/057552 A1 | 7/2004 |
| WO | WO 2007/028964 A1 | 3/2007 |

OTHER PUBLICATIONS

Aug. 17, 2012 Office Action issued in Japanese Patent Application No. 2008-193409 (with translation).
Feb. 29, 2012 Office Action issued in U.S. Appl. No. 12/216,609.
Sep. 20, 2012 Notice of Allowance issued in U.S. Appl. No. 12/216,609.
Jan. 26, 2012 Office Action issued in U.S. Appl. No. 12/219,513.
Aug. 17, 2012 Office Action issued in U.S. Appl. No. 12/219,513.
Mar. 9, 2011 Search Report issued in European Patent Application No. EP 08252273.
Mar. 11, 2011 Search Report issued in European Patent Application No. EP 08252268.
Jul. 12, 2011 Office Action issued in Japanese Patent Application No. 2008-193409, with translation.
Nov. 20, 2009 Office Action issued in Chinese Patent Application No. 200810135025.7, with translation.
May 24, 2011 Office Action issued in Japanese Patent Application No. 2008-193436, with translation.
U.S. Appl. No. 12/219,513 in the names of Tim Prestidge et al., filed Jul. 23, 2008.
U. S. Appl. No. 12/216,609 in the names of Tim Prestidge et al., filed Jul. 8, 2008.
Jul. 8, 2011 Office Action issued in U.S. Appl. No. 12/216,609.
Nov. 18, 2010 Office Action issued in U.S. Appl. No. 12/219,513.
Jul. 6, 2011 Office Action issued in U.S. Appl. No. 12/219,513.
"Protecting the R&D Investment—Two-Way Authentication and Secure Soft-Feature Settings", Application Note 3675, Dallas Semiconductor, Maxim, Oct. 24, 2005.
Chinese Office Action issued on Apr. 12, 2009 in corresponding Chinese Patent Application No. 200810135023.8.
Feb. 24, 2012 Office Action issued in U.S. Appl. No. 12/216,576.
Feb. 27, 2013 Final Rejection issued in U.S. Appl. No. 12/219,513.
Apr. 9, 2013 Corrected Notice of Allowability issued in U.S. Appl. No. 12/216,576.
May 16, 2013 Corrected Notice of Allowability issued in U.S. Appl. No. 12/216,609.
Jun. 29, 2011 Office Action issued in U.S. Appl. No, 12/216,576.
Jul. 20, 2010 Office Action issued in U.S. Appl. No. 12/216,576.
Nov. 26, 2012 Notice of Allowance in U.S. Appl. No. 12/216,576.
Dec. 3, 2012 Notice of Allowance in U.S. Appl. No. 12/216,609.
Dec. 22, 2010 Office Action issued in U.S. Appl. No. 12/216,576.
U.S. Appl. No. 12/216,576 in the name of Prestidge et al., filed Jul. 8, 2008.
Aug. 23, 2013 Office Action issued in Japanese Application No. 2008-193409 (with English translation).

* cited by examiner

DEACTIVATABLE MEASUREMENT APPARATUS

CROSS-REFERENCE TO PRIOR APPLICATIONS

This application is a continuation of U.S. patent application Ser. No. 12/216,576, filed on Jul. 8, 2008, which claims the benefit of U.S. Provisional Patent Application No. 60/996,984, filed on Dec. 13, 2007, and of European Patent Application No. 07252959.7, filed on Jul. 26, 2007, the disclosures of which are incorporated herein by reference.

BACKGROUND i) Field of the Invention

The present invention relates to measurement apparatus and methods of operating such apparatus. In particular, the invention relates to measurement apparatus having a deactivation portion for inhibiting normal operation.

ii) Description of Related Art

Many different types of measurement apparatus are known. Such apparatus includes so-called dimensional measurement apparatus for measuring a physical dimension of an object. Examples of dimensional measurement apparatus include measurement probes, optical position encoders etc. Non-dimensional measurement apparatus is also known for measuring a property of an object other than a dimension; for example, temperature probes, Raman spectrometers, Fourier transform infrared spectrometers etc.

Measurement apparatus is usually manufactured to acquire measurements with a certain level of accuracy. It is also possible that periodic updates to the firmware of the measurement probe or software of the associated computer controller may be necessary to ensure that optimum levels of device performance are maintained. For certain measurement devices, periodic recalibration may also be required. Such updates can, however, be unintentionally overlooked resulting in the measurement device providing reduced measurement accuracy over time and/or with use.

SUMMARY

According to a first aspect of the invention, measurement apparatus comprises; a measurement portion for acquiring object measurements; an output portion for outputting measurement data relating to the acquired object measurements; and a deactivation portion for inhibiting normal operation of the measurement apparatus such that output of the measurement data is prevented; characterised in that the deactivation portion, in use, reads apparatus usage information from an apparatus usage module and inhibits normal operation of the measurement apparatus if said apparatus usage information fails to meet one or more predetermined criteria, wherein the apparatus usage information provides a measure of the amount of measurement apparatus usage.

Measurement apparatus is thus provided that, in normal operation, is able to acquire measurements of an object or objects and output measurement data relating to such measurements. The deactivation portion is arranged to read apparatus usage information that provides a measure of the amount of measurement apparatus usage from an apparatus usage module (e.g. a memory or a clock) and inhibit normal measurement operation (e.g. by stopping onward transmission of the measurement data) if certain predetermined criteria are not met. It should be noted that the deactivation portion may also be thought of as an activation portion that only allows normal operation of the measurement device when the one or more predetermined criteria are met.

The apparatus usage information may comprise any suitable measure that relates to the amount of measurement apparatus usage. The apparatus usage information may comprise, for example, a count value relating to a number of measurements previously taken, the amount of time the measurement apparatus has been operating, the amount of time that has elapsed since the measurement apparatus was initially activated or a measure of absolute time. The deactivation portion may be arranged to periodically compare the apparatus usage information (which may be updated with time and/or usage of the measurement apparatus as appropriate) against the one or more predetermined criteria and inhibit normal measurement apparatus operation if those criteria are not met. In this manner, measurement apparatus is provided that will deactivate itself after a certain predetermined time or event; for example, deactivation may occur after the acquisition of a certain number of measurements or after a certain amount of time. The apparatus usage module may, as described in more detail below, be an integral part of the measurement apparatus or may be contained in an associated unit (e.g. an activation button, smart card etc) that is attachable to a part of the measurement apparatus.

The present invention can thus be seen to be beneficial over known measurement devices (e.g. measurement probes and the like) that have no specified or predetermined lifetime. Although certain consumable components (e.g. batteries, styli etc) of known measurement apparatus may wear and need to be replaced, such apparatus is typically used until it becomes inoperable through some sort of mechanical failure. This has the disadvantage that such apparatus may continue to be used well after the measurement accuracy has degraded to unacceptable levels or when replacement products or updates are available that would provide improved measurement performance. In contrast, measurement apparatus of the present invention allow the operational lifetime (e.g. the time and/or amount of usage) of the measurement apparatus to be pre-defined by a manufacturer. Although, as described below, it is possible to "reset" the measurement apparatus after it has become deactivated by refreshing or replacing the apparatus usage module, control of such a refresh operation can be kept by the manufacturer. For example, a procedure for refreshing measurement apparatus of the present invention by updating/replacing the apparatus usage module may also include providing updates to the firmware or software of the measurement apparatus or may require an appropriate calibration process to be performed. In this manner, it is possible to ensure that a certain level of measurement accuracy is always maintained.

An additional benefit of the present invention arises from the ability to limit the operational lifetime of the measurement apparatus. At present, precision measurement devices are often expensive to manufacture and the high upfront cost in purchasing such devices can be a disincentive to potential users. For example, in the machine tool field the high upfront cost of adding a measurement probe to a machine tool may prevent the uptake of such technology by potential users who are unaware, or uncertain, of the cost savings that could be achieved by implementing automated machine tool based production processes using such measurement probe devices. The present invention may thus allow users to take advantage of the benefits of measurement technology at a much lower upfront cost. If the measurement apparatus is found to be useful, further usage of the equipment after the initially defined operational lifetime may be purchased.

As mentioned above, the apparatus usage module may comprise a memory (e.g. an electronic memory chip) that stores apparatus usage information that can be read by the deactivation portion. Advantageously, the apparatus usage information stored in such a memory is updated with apparatus usage; for example, the apparatus usage information may comprise information related to the amount of usage of the measurement apparatus (e.g. the number of acquired measurements) or the length of time that the apparatus has been operating. Although a separate means (e.g. a clock) could be used to update the apparatus usage information, the deactivation portion is advantageously arranged to update the apparatus usage information stored by the memory as the measurement apparatus is used. Alternatively or additionally, the apparatus usage module may comprise a clock that independently generates the apparatus usage information. The apparatus usage module may be provided as part of a separate device (e.g. as a separate activation button or fob of the type described in more detail below) or it may form an integral part of the measurement apparatus.

Advantageously, the apparatus usage information comprises a measurement count value relating to the number of (acquired) object measurements. Preferably, the apparatus usage module comprises a memory for storing such a measurement count value. If the measurement apparatus comprises a measurement probe, the measurement count value may, for example, comprise a "trigger count" value. Although the measurement count value could be a number that is incremented with each acquired measurement, the measurement count value stored in the memory is preferably decremented for each object measurement that is acquired by the measurement apparatus. In this manner, the memory stores a measurement count value that reduces with each use of the measurement apparatus. In such an example, the one or more predetermined criteria may comprise a single criterion which is met if the measurement count value is greater than zero. In other words, normal measurement apparatus operation occurs until the count reduces to zero, whereupon the deactivation portion causes normal operation of the measurement apparatus to cease.

It should be noted that the apparatus usage information may be provided in the form of units or blocks of time and/or measurement counts. For example, the apparatus usage information may comprise measurement count units, where each measurement count unit relates to N measurements (N being greater than one). Similarly, the apparatus usage information may comprise time units or blocks that each relate to a certain (predetermined) period of apparatus operation. For example, the apparatus usage information may be provided in the form of time units that each relate to a certain length of time (e.g. one minute or five minutes etc) of measurement apparatus usage.

Advantageously, the measurement apparatus comprises an integral apparatus usage module that preferably comprises an internal memory for storing said apparatus usage information. In other words, the memory that is read by the deactivation portion may be an integral (e.g. non-removable) part of the measurement apparatus. As outlined above, the apparatus usage information will typically be updated with measurement apparatus usage; for example it may comprise a measurement count value that is decremented with use. After the apparatus usage information fails to meet the predetermined criteria (e.g. when a measurement count value decrements to zero) the deactivation portion inhibits normal probe operation. This may be a permanent deactivation that requires the measurement apparatus or a component thereof to be replaced. It is, however, preferable that the apparatus usage information stored in such an internal memory can be refreshed.

Refreshing apparatus usage information stored within the internal memory of the measurement apparatus may involve also securely storing a plurality of unique release codes within the measurement apparatus. If a matching release code is entered (e.g. via a key pad) the apparatus usage information is updated (e.g. the measurement count value may be increased by a certain amount). In such an arrangement, each measurement probe (which could be identified by a serial or identification number) would store unique release codes that could be supplied by the manufacturer/supplier to the end-user on request.

Advantageously, the measurement apparatus comprises an interface for communicating with an associated unit, the associated unit storing information for updating the internal memory of the measurement apparatus. If the associated unit updates the internal memory of the measurement apparatus (e.g. by increasing a measurement count value), the information stored by the associated unit may be updated accordingly (e.g. by decreasing a measurement count value stored in the associated unit). Conveniently, the apparatus may be provided as a kit that also comprises an associated unit. As described in more detail below, the associated unit may be an activation button, smart card etc.

The measurement apparatus advantageously comprises an interface for communicating with an associated unit, wherein the associated unit comprises the apparatus usage module. The apparatus usage module of the associated unit preferably comprises a memory that stores apparatus usage information. In other words, the main memory for storing the apparatus usage information can be located in an associated unit that is separate from, but interfaced to, the measurement apparatus. Conveniently, a kit may be provided that comprises the measurement apparatus and the associated unit. It should be noted that the measurement apparatus may also comprise an internal memory buffer such that the main memory store of the associated unit only needs to be read and/or updated periodically.

Providing an associated unit having the main memory for storing the apparatus usage information has the advantage that it allows apparatus usage information (e.g. measurement count values) to be readily transferred between different measurement apparatus. In this manner, a certain number of measurement counts can be obtained (e.g. purchased) that can be expended on any one of a number of different pieces of measurement apparatus. Similarly, a plurality of associated units may be used in combination with the measurement apparatus; e.g. a new associated unit may be used with the measurement apparatus after a previous associated unit has been spent.

Advantageously, the measurement apparatus comprises an authentication module for verifying the authenticity of an associated unit. The associated unit may comprise an analogous or complementary authentication module. The measurement apparatus may be arranged to only interact with associated units that are found to be authentic; this prevents the measurement apparatus acting on apparatus usage information or update information from non-authentic devices. The provision and use of such an authentication module is described in more detail in Applicant's co-pending patent application that claims priority from European patent application 07252965.4.

The above mentioned communications link between the measurement apparatus and the associated unit may be implemented in a number of ways. Advantageously, the interface of the measurement apparatus comprises one or more electrical contacts for allowing electrical connection with the complimentary electrical contacts of an associated unit. In other words, a physical (conductive) link may be provided between the measurement apparatus and associated unit. Alternatively, the interface may comprise a wireless communications unit. A wireless link can then be conveniently established between the measurement apparatus and an associated unit. The associated unit may thus take the form of a smart card or activation button of the type described in detail below. Alternatively, the associated unit may be a wireless fob or the like.

Preferably, the deactivation portion is permanently disabled on receipt of a total release code thereby allowing ongoing (unlimited) normal operation of the measurement apparatus. In other words, the measurement apparatus may include means for stopping the deactivation portion operating. This may allow measurement apparatus of the present invention to be converted into measurement apparatus that operates as normal.

The measurement apparatus may be provided as a single integrated unit. For example, the apparatus may solely comprise a measurement device that incorporates each of the measurement portion, the output portion and the deactivation portion. The measurement device may also include a housing to contain the various components. In such an example, the measurement device is preferably arranged to transfer any measurement data to a remote interface via a wireless (e.g. RF or optical) link. The output portion thus advantageously comprises a wireless transmitter for transmitting measurement data to a separate, remote, interface. Advantageously, the deactivation portion inhibits output of the measurement data by deactivating the wireless transmitter. The apparatus usage module may be integral with the measurement device or interfaced thereto. The wireless link provided by the output portion may also provide a wireless link to an associated unit of the type described above.

Instead of providing an integrated measurement device, the various components of the measurement apparatus may be provided as a plurality of discrete distributed units that are interconnected in some manner. For example, the apparatus may thus comprise a measurement device (e.g. a measurement probe) linked to an interface (e.g. a probe interface). The measurement device may include the measurement portion and the interface may include the output portion. The deactivation portion may then inhibit normal operation of the apparatus by preventing output of measurement data from the output portion of the interface when the above mentioned predetermined criteria are not met. In other words, the deactivation portion may be provided as part of the interface and/or the measurement probe and may control whether the measurement data is output by the interface. In such an example, measurement data may be passed between the measurement probe and the interface via a wired or wireless link. The measurement apparatus may also include a computer controller (e.g. the computer that controls overall operation of a machine tool) that is linked to a measurement device (e.g. a measurement probe) optionally via an interface (e.g. a probe interface). In such an example, the deactivation portion may be implemented by software running on the controller that can prevent usage of the measurement data by other parts of the software if the predetermined criteria are not met.

The invention may be applied to any type of measurement apparatus; for example, the measurement portion may comprise a Raman spectrometer or similar for acquiring data from objects provided in the form of samples. The measurement apparatus may also comprise a temperature probe or the like. Advantageously, the measurement apparatus comprises a contact or non-contact (e.g. optical, video etc) measurement probe. If a contact measurement probe is provided, the measurement portion may comprise a deflection measurement mechanism and a deflectable stylus. The measurement probe may be a touch trigger probe that issues a trigger signal whenever stylus deflection exceeds a certain threshold. Alternatively, the measurement probe may be an analogue or scanning probe in which the amount of stylus deflection is measured (e.g. using strain gauges) and an output is provided containing information about the position of the stylus tip relative to the body of the measurement probe. In either case, the stylus may be releasably retained by a stylus holder that forms part of the deflection measurement mechanism thereby allowing stylus replacement.

According to a second aspect of the present invention, a method of operating measurement apparatus comprises the steps of: (i) using the measurement apparatus to acquire object measurements; (ii) outputting measurement data from the measurement apparatus that are related to the measurements acquired in step (i); characterised by performing the step of (iii) reading apparatus usage information and only performing step (ii) if said apparatus usage information meets one or more predetermined criteria.

Also described herein is a measurement device including a measurement portion for acquiring a series of object measurements, wherein the device comprises a device usage counter for counting the number of measurements acquired by the measurement portion. A deactivation device may also be provided for inhibiting any further operation of the measurement device after the count reaches a certain value.

A measurement device is also described herein that comprises; a measurement portion for acquiring object measurements; an output portion for outputting measurement data relating to the acquired object measurements; and a deactivation portion for inhibiting normal operation of the measurement device such that output of the measurement data is prevented; wherein the device disabler inhibits operation of the measurement device after the occurrence of a predetermined event (e.g. after a certain number of measurement) and in that said device disabler only permits continued operation of the measurement device on receipt of an appropriate reactivation instruction. Conveniently, the predetermined event comprises a certain amount of usage (e.g. a certain length of time of usage and/or the acquisition of a certain number of measurements) of the measurement device.

BRIEF DESCRIPTION OF THE DRAWINGS

The invention will now be described, by way of example only, with reference to the accompanying drawings in which.

DETAILED DESCRIPTION OF THE EMBODIMENTS

Figure 1:
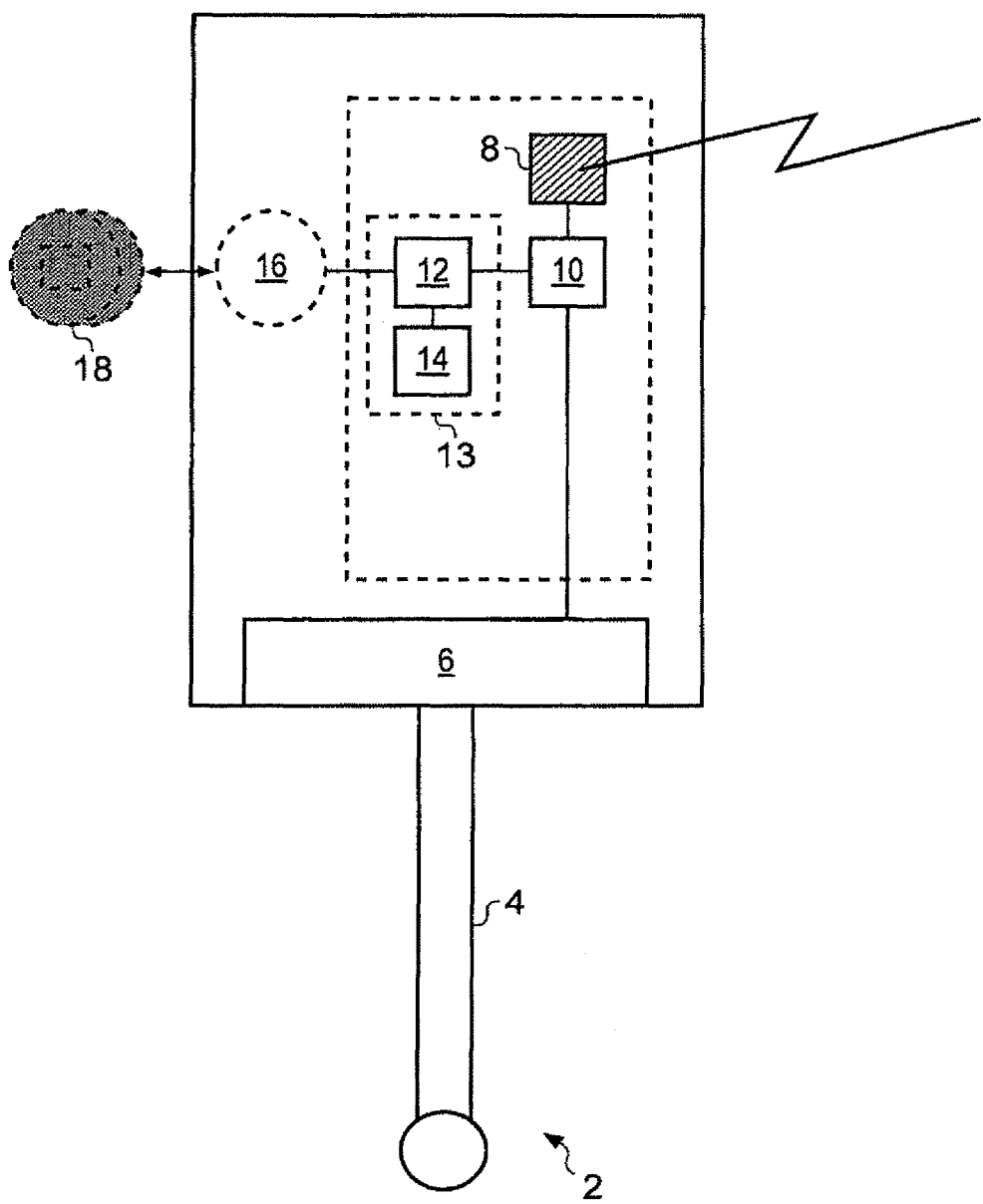
FIG. 1 shows a measurement probe and activation button according to the present invention.

Referring to FIG. 1, a measurement probe 2 of the present invention is shown. The measurement probe 2 is a so-called touch trigger probe having a deflectable stylus 4 releaseably attached to a deflection measurement unit 6. The deflection measurement unit 6 is of known type and comprises a stylus holder mounted to the measurement probe housing via a set of balls and rollers. Deflection of the stylus causes disengagement of the balls from the rollers thereby breaking an electrical circuit and producing a so-called trigger signal. The measurement probe 2 comprises a wireless (RF) communications unit 8 for transmitting trigger signal data to a remote probe interface (not shown) in a known manner. Although a wireless RF link is described herein, it should be noted that any type of wired or wireless link may be used. For example, the RF communications unit 8 could be substituted for an optical communications unit.

The measurement probe 2 also comprises a deactivation device 10. The deactivation device 10 is arranged to prevent normal operation of the measurement probe if certain criteria are not met. Deactivation of the measurement probe may be implemented in a number of ways. For example, the deactivation device 10 could force the measurement unit 6 to power down or enter some kind of standby mode. Alternatively, the measurement probe could continue to produce trigger signals as normal but the transfer of trigger signal data to the remote interface via the wireless communications unit 8 could be blocked. In short, the deactivation device 10 is arranged to stop normal measurement probe operation thereby making the measurement probe inoperable. The measurement probe also includes an authentication module 13 that comprises an authentication device 12 and associated electronic memory 14. An externally accessible electrical connection pad 16 is also provided that allows electrical connections between the authentication module 13 and an associated activation button 18 to be established. It should be noted that the measurement probe will typically include various additional components (e.g. filtering or data processing electronics, batteries etc) but these are not shown for clarity.

Figure 2:
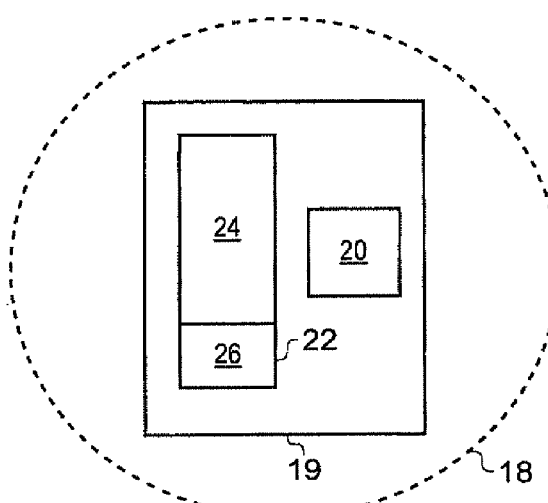
FIG. 2 shows the components of the activation button in more detail.

Referring now to FIG. 2, the activation button 18 is shown in more detail. The activation button 18 includes an authentication module 19 comprising an authentication device 20 and an electronic memory 22. The memory 22 comprises a permanent memory portion 24 and a rewritable memory portion 26 for storing a trigger count value.

Referring to both FIGS. 1 and 2, operation of the measurement probe 2 with an activation button 18 attached will be described.

Firstly, a two-way authentication process is used to verify the authenticity of the measurement probe 2 and the activation button 18. Details of a suitable authentication technique are described in more detail below with reference to FIG. 3, but the basic principle is that a secret key is stored in the electronic memories 14 and 24 of the measurement probe 2 and the activation button 18. The authentication device 12 of the measurement probe 2 and the authentication device 20 of the activation button 18 communicate with one another to perform an authentication check which, without disclosing the secret key, confirms that the electronic memories of the measurement probe 2 and the activation button 18 hold the same secret key.

Once the measurement probe 2 has established that an authentic activation button 18 is attached to its external electrical connection pad 16, the trigger count value stored in the rewritable memory portion 26 of the activation button is read by the measurement probe. If the trigger count value is non-zero, the deactivation device 10 permits normal measurement probe operation. Thereafter, the trigger count value stored in the rewritable memory portion 26 is decremented by one for each trigger signal that is generated by the measurement probe. It should be noted that the trigger count value stored in the rewritable memory portion 26 of the activation button 18 may be decremented after each trigger signal is issued or the measurement probe 2 may have some kind of temporary memory buffer (e.g. part of the memory 14) for storing trigger counts and means for periodically updating the main trigger count value stored in the rewritable memory portion 26 of the associated activation button. For example, the trigger count value stored in the rewritable memory portion 26 may be updated at regular time intervals or whenever a certain number (e.g. ten, fifty, one hundred etc) of trigger signals have been issued by the measurement probe. The use of a memory buffer within the measurement probe reduces the required number of updates to the value stored in the rewritable memory portion 26 of the activation button. However, any buffer is preferably not too large because the main count stored by activation button may not be decremented properly if the activation button is removed prior to an update event.

A measurement probe of the present invention thus operates normally in the presence of an activation button 18 containing a non-zero trigger count; i.e. the measurement probe issues a trigger signal whenever the stylus is deflected. However, removal of the activation button 18 or the reduction of the stored trigger count to zero causes the deactivation device 10 to stop normal probe operation thereby preventing measurements being made with the measurement probe. In this manner, the operational lifetime of the measurement probe can be set by a manufacturer. For example, a measurement probe may be sold with an activation button that stores a certain trigger count value (e.g. five or ten thousand trigger counts). After the trigger count is expended, a further activation button may be obtained from the manufacturer to reactivate the measurement probe. The new activation button may be provided with instructions for verifying the measurement probe is operating within the necessary tolerances and/or any appropriate firmware updates for the measurement probe may be provided with the replacement activation button. In this manner, the requirement to periodically refresh the measurement probe can also have the advantage of forcing a user to periodically update or check the operational performance of the measurement probe thereby ensuring the required measurement accuracy is maintained.

Although FIG. 1 illustrates a measurement probe 2 having an authentication module 13, an electrical contact pad 16 and a deactivation device 10, it should be noted that such components may alternatively or additionally be provided as part of the remote probe interface. In such an example, the measurement probe may pass all measurement data to such a probe interface and the probe interface may then only pass on measurement data (e.g. to a machine controller) if an authentic activation button storing a non-zero trigger count is attached to its electrical contact pad. As a further alternative, the measurement probe may include the authentication module and an electrical contact pad for reading a trigger count from an activation button whilst the probe interface may comprise a deactivation device. The data transmitted by the probe to the interface may then contain information that indicates whether an authentic activation button storing a non-zero trigger count is attached to the electrical contact pad of the measurement probe. If the measurement probe provides an indication that there is no authentic activation button storing a non-zero trigger count attached thereto, the deactivation device of the probe interface may be arranged to prevent the output of any measurement data.

It should be noted that although the above examples work by storing and decrementing a trigger count value, other values could be stored and measured. For example, the measurement probe could include a clock that measures the length of time that the measurement probe is actively operating. In such an example, the activation button could then include a certain operational time value that is decremented by the operational time value accrued as the measurement probe operates. A combination of time and trigger count values could also be used. For example, the activation button could store separate counts related to the time of operation and the number of triggers. The deactivation device 10 could then allow normal measurement probe operation until the stored trigger count or the stored time of operation count is expended. It should also be noted that the trigger count could alternatively increment with use and the deactivation device could stop normal operation when a maximum count value is reached. Although the above described activation button includes a memory for storing some kind of count or time value this is by no means essential. The activation button could, for example, alternatively comprise a clock or similar that separately measures elapsed time.

Figure 3:
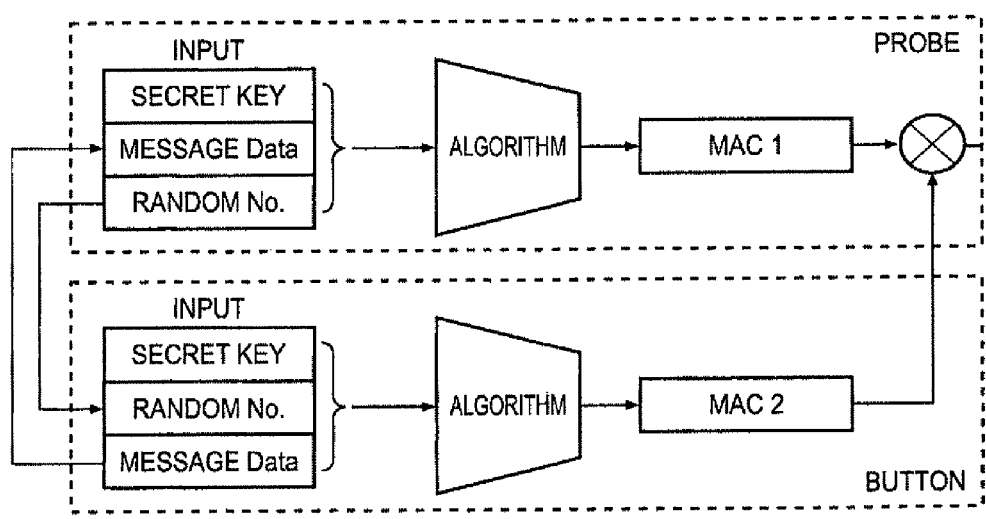
FIG. 3 illustrates the principles behind a two-way authentication process.

Referring now to FIG. 3, the basic principle of the two way authentication technique employed by the apparatus described with reference to FIGS. 1 and 2 is illustrated.

As outlined above, the measurement probe 2 and the activation button each include an authentication device. Each authentication device runs the SHA-1 algorithm developed by the National Institute of Standards and Technology (NIST) of the USA. The SHA-1 algorithm is a so-called one-way hash function that generates a fixed length Message Authentication Code (MAC) from input data. The SHA-1 algorithm has the properties of being irreversible; i.e. it is computationally infeasible to determine the input that corresponds to a generated MAC. The algorithm is also collision-resistant such that it is impractical to find more than one input message that produces a given MAC. Furthermore, the algorithm has a high avalanche effect meaning that any minor change in the input produces a significant change in the MAC that is generated. Although use of the SHA-1 algorithm is described in detail herein, it should be noted that many alternative algorithms could be used to implement similar types of authentication.

The two-way authentication process, which can also be termed challenge and response authentication, relies on the measurement probe and activation button both storing the same secret key in a secure (i.e. externally inaccessible) memory. When authentication is required, for example when an activation button is located in the electrical contact pad 16 of the measurement probe, the activation button sends message data (e.g. the activation button serial number plus the stored trigger count value) to the measurement probe. The message data contains no secret information and there is no threat to the security of the authentication process if the message is intercepted. The measurement probe responds by sending a random data string as a "challenge" to the activation button.

The measurement probe then applies its SHA-1 algorithm to an input that includes the secret key, the message data and the random data string and produces a MAC therefrom; this MAC can be termed MAC1. The activation button takes the same input data (i.e. the secret key, the message data and the random data string) and uses its SHA-1 algorithm to generate a MAC; this MAC can be termed MAC2. The measurement probe then compares MAC1 and MAC2. If MAC2 matches MAC1 it is certain (to a very high level of confidence) that the same secret key is stored by both the measurement probe and the activation button. The measurement probe then assumes that the activation button is genuine. It should be reemphasised that the authentication process does not compromise the secrecy of the secret key; i.e. the secret key itself is never passed between devices.

A similar two-way authentication check is also performed before data is written to the rewritable memory 26 of the activation button 18. In such a process, the activation button 18 generates the random number and performs the MAC comparison. This authentication process prevents the security of the activation button 18 being compromised by ensuring that only an authentic device (such as measurement probe 2) can alter the stored trigger count value. In other words, the authentication check guards against unauthorised users tampering with the trigger count value that is stored by the activation button 18.

A number of authentication devices suitable for incorporation into a measurement probe are available commercially and are described in more detail elsewhere. For example, suitable apparatus is the Maxim/Dallas i-button available from Maxim Integrated Products Inc, Sunnyvale, Calif., USA.

Figure 4:
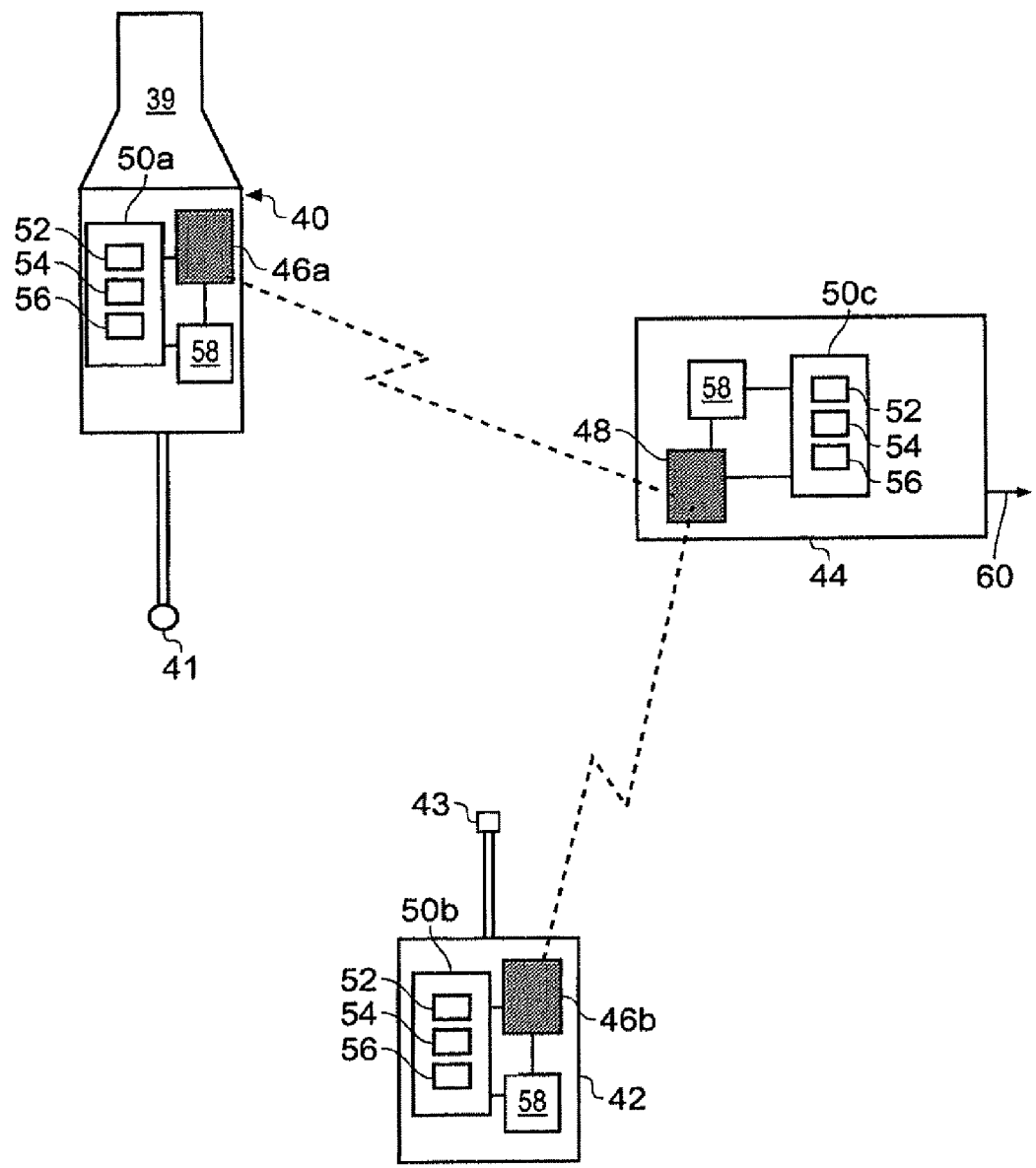
FIG. 4 shows a measurement probe kit for use on a machine tool.

Referring to FIG. 4, measurement kit for use with a machine tool is illustrated. The measurement kit comprises a spindle mountable measurement probe 40, a table top (tool setting) measurement probe 42 and a probe interface 44. The spindle measurement probe 40 and the table top measurement probe 42 (which are hereinafter collectively termed the measurement probes) communicate with the probe interface 44 over a wireless radio frequency (RF) link. The measurement probes 40 and 42 are both touch trigger probes that issue a trigger signal whenever stylus deflection exceeds a certain threshold value. The trigger signal can be used to freeze machine position information; e.g. the location of the spindle can be determined in the x, y and z machine co-ordinates system as measured by machine position encoders. The spindle mountable measurement probe 40 has a spindle mountable shank 39 and a stylus having a ruby ball tip 41; this allows points to be measured on the surface of a workpiece. The table top measurement probe 42 has a tool setting cube 43 mounted to its stylus tip and is used to determine the position of cutting tools held by the machine tool spindle. For clarity, the associated machine tool on which such apparatus could be used is not shown in FIG. 4.

In order to overcome the various problems associated with hardwired measurement probe systems, the interface 44 communicates with the measurement probes 40 and 42 via a spread spectrum wireless RF link. To allow multiple systems to operate side by side, each measurement probe prefixes all of its data transmissions with a probe identification (ID) code. An initial "pairing" procedure is performed in which the interface 44 learns the ID code of the measurement probe that is intended for use with that particular interface. After pairing, the interface 44 will only process received data that contains the ID code of the paired measurement probe thereby ensuring that data transmissions are ignored that originate from any other measurement probes (i.e. probes having different ID codes) that may be in the vicinity. Once paired, the measurement probe and interface will frequency hop in a predefined manner to mitigate the effects of noise from other RF sources. More details about the spread spectrum, or frequency hopping, communications link are outlined in WO2004/57552. A variant of WO2004/57552 is also described in detail in PCT application WO2007/28964. The apparatus of WO2007/28964 allows multiple probes to be paired to a single interface by allowing the probe IDs of a measurement probe to be set by a user or by allowing the interface to recognise transmissions that contain any one of a plurality of different ID codes. Such an arrangement allows two or more probes to be used (non-concurrently) with a single interface.

To implement the frequency hopping RF link mentioned above, the spindle mounted measurement probe 40 and the table top measurement probe 42 each comprise wireless communications units 46a-46b. The interface 44 includes a corresponding wireless communications unit 48 for communicating with the communications unit 46 of a measurement probe. In normal use, the wireless communications units 46 and 48 allow data transfer between any one of the measurement probes 40 and 42 and the paired interface 44 in the known manner outlined above.

The interface 44, spindle measurement probe 40 and table top measurement probe 42 contain authentication modules 50a-50c. Each authentication module 50 comprises an authentication device 52 for running the SHA-1 hash algorithm, a secure memory portion 54 for storing a secret key and a random data string generator 56. The interface 44 and the measurement probes 40 and 42 also comprise deactivation devices 58a-58c for inhibiting normal operation. As outlined above, deactivation may be implemented in various way; for example, a deactivated measurement probe may not transmit trigger signals via the wireless communications unit whilst a deactivated interface may not output any data on its trigger signal output line 60.

In use, a set-up routine is performed in which a measurement probe (e.g. spindle mountable probe 40) and the interface 44 are placed in "pairing" mode. In common with systems of the type described in WO2004/57552, the pairing procedure involves the measurement probe repeatedly transmitting its ID code. The interface searches for any ID codes transmitted by an unpaired probe and, when the relevant measurement probe ID code is received, it is stored by the interface. After pairing, the interface ignores any data it receives that does not contain the stored ID code. As outlined in WO2007/28964, the interface may also be paired with a further measurement probe (e.g. the table top measurement probe 42) by storing a second probe ID code or by loading the stored probe ID code into the further measurement probe. It can be seen that a potential weakness of such a pairing procedure is that it allows any components to be paired so long as the requirements of the communication protocol are met. The communications protocol can, however, be easily copied which would allow replica or incompatible measurements probes and/or interfaces to be used with genuine ones. This can seriously and unpredictably degrade the measurement performance of the kit.

As outlined above, the probes and interfaces of FIG. 4 also include authentication modules 50 having a secure memory portion 54 in which a secret key is stored. After a measurement probe has been paired with the interface, an authentication step is performed in which the measurement probe verifies that the interface is authentic (i.e. that it stores the same secret key) and vice versa. The challenge and response authentication process is analogous to that described with reference to FIG. 3, with each authentication device 52 applying its SHA-1 algorithm to input data that includes the secret key stored in its associated secure memory portion 54, a message (e.g. the probe ID code) and a random data string generated by one of the random data string generators 56. Exchanges of the MACs, messages and random data strings are performed using the wireless communications units 46. If the measurement probe or interface confirms, by comparing self-generated and received MACs, that it has been paired with a genuine counterpart (i.e. a counterpart storing the same secret key) normal operation of the apparatus is permitted. However, if a probe or interface fails to establish the authenticity of its counterpart, the deactivation device 58 prevents normal operation.

The authentication process described above may be performed only after pairing, each time a measurement probe is turned-on, at predetermined time intervals and/or during periods in which measurements are not being acquired. If required, the authentication process may also be performed before the pairing operation. In this manner, it is ensured that authentic measurement probes only ever operate normally with authentic interfaces and vice versa. Apparatus of this type can thus guarantee, to a high level of certainty, that only fully compatible measurement probes and interfaces can be used in combination. Providing an authentication process of this type thus prevents an interface being used with a certain type of measurement probe if that interface is unable to properly process the measurement probe data it receives because, for example, the format of the received data differs to that expected by the interface or requires the application of different processing techniques. The authentication process thus means that, for example, a manufacturer can provide different ranges of measurement probes and interfaces that use the same communications protocols. Compatible equipment can be assigned a common secret key, whilst it is ensured that incompatible equipment stores different secret keys. In this manner, the user is unable to use incompatible equipment in combination thereby reducing the chances of apparatus malfunction and/or the introduction of unacceptably large measurement errors. Such an arrangement also prevents third party, possibly inferior quality, apparatus being used with authentic devices which again ensures that measurement accuracy is not compromised.

Although by no means essential, the measurement probes 40 and 42 shown in FIG. 4 may be measurement probes of the type described above with reference to FIG. 1. In particular, each measurement probes may comprise a deactivation device (which may be the same or different to the deactivation device 58) that only permits normal probe operation if an authentic activation button storing a non-zero trigger count value is attached to an electrical connection pad provided on the measurement probe. In such an arrangement, the kit will only operate normally if the interface and measurement probes are authentic and if the measurement probes each have an authentic activation button attached thereto that contains a non-zero trigger count.

The measurement probe described with reference to FIG. 1 includes an external electrical connection pad 16 for receiving an activation button. In certain circumstances it is, however, preferable for the activation button to be sealed inside the measurement probe during use. This ensures that the activation button does not become accidentally detached from the measurement probe or damaged; this may occur, for example, during the process of loading a spindle probe into the machine tool spindle using an automated tool change device. A measurement probe may thus be provided that includes a separate, preferably sealable, compartment for receiving the activation button. Alternatively, the battery retaining compartment of the measurement probe may be adapted to also hold the activation button as will now be described in more detail.

Figure 5:
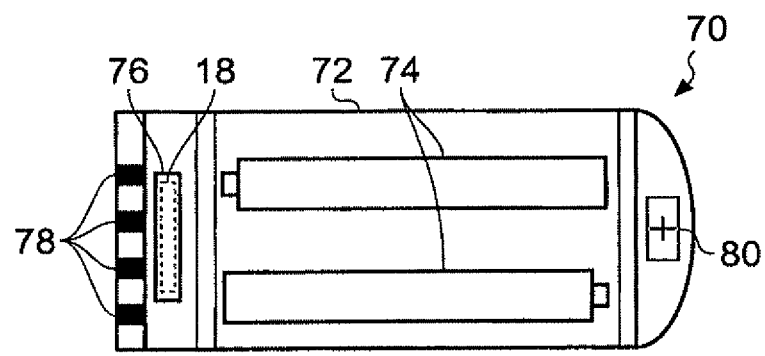
FIG. 5 shows an integrated battery and activation button holder.

Referring to FIG. 5, a battery holder 70 for a measurement probe is illustrated. The battery holder 70 includes a compartment 72 in which batteries 74 are located. In addition, a slot 76 is provided in which an activation button 18 can be placed. Electrical contacts 78 are also provided for establishing the necessary electrical connections between the batteries and activation button and the electronics of the measurement probe. A locking mechanism 80 may also be provided to securely retain the battery holder 70 in the probe body. This arrangement ensures good electrical contact is maintained even in a harsh operating environment and also prevents damage to the activation button.

The battery holder of FIG. 5 also has the advantage that removal of the activation button also requires removal of the batteries. This ensures that the probe is powered down whenever the activation button is removed. In such apparatus, the authentication process need only be performed on power-up of the measurement probe because it is impractical to remove or replace the activation button after the measurement probe has been switched on.

It is important to note that the use of an activation button as described above provides a convenient way to implement the invention but is by no means the only solution. In other words, the use of an activation button of the type described above is advantageous but by no means essential. Many alternative types of device could be used to securely store a trigger count and implement some kind of authentication or encryption technique. For example, a smart card or other similar device may be used.

Figure 6:
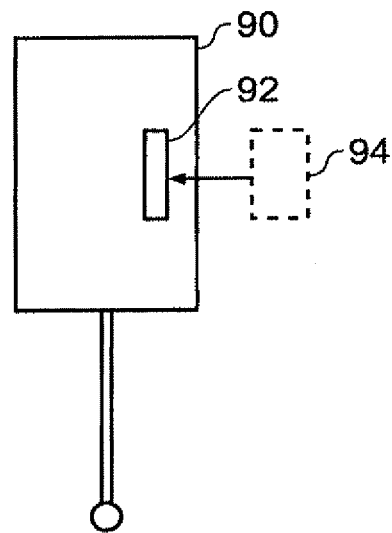
FIG. 6 shows a measurement probe having a slot for receiving a smart card.

Referring to FIG. 6, a measurement probe 90 is illustrated that comprises a slot 92 for receiving a smart card 94. The slot 92 may be sealable. The smart card 94 includes a memory to store a secret key, a processor for implementing the SHA-1 algorithm and a rewritable memory for storing a trigger count value. The measurement probe contains complimentary apparatus such that a challenge and response authentication process of the type described above can be carried out between the measurement probe and smart card. If required, the slot 92 for the smart card may be formed as part of the battery holder thereby physically protecting the card from damage.

The measurement probes described above are arranged to operate only when an activation button, smart card or similar device storing a trigger count data is attached to the probe. It is, however, also possible for the measurement probe itself to comprise a rewritable memory that stores the trigger count value. The activation button (or similar) is then only required when the trigger count stored in the probe needs to recharged or refreshed.

Figure 7:
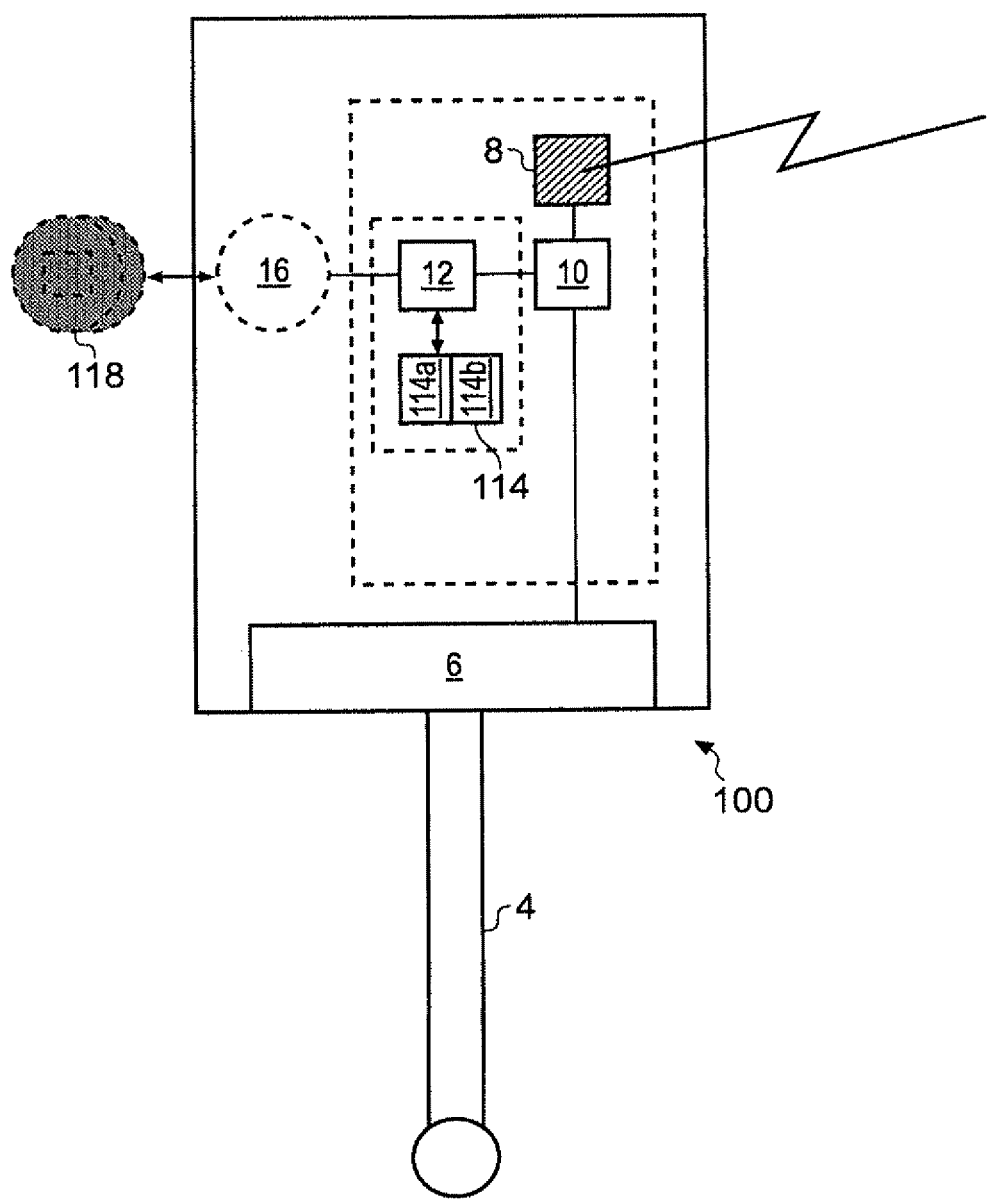
FIG. 7 shows a measurement probe having an integral memory for storing a trigger count value.

Referring to FIG. 7, a measurement probe 100 is shown that is a variant of the measurement probe of FIG. 1. In common with the measurement probe described with reference to FIG. 1, the measurement probe 100 comprises a deflectable stylus 4 attached to a deflection measurement unit 6, a wireless communications unit 8 for communicating with a remote interface and a deactivation unit 10. An electrical connection pad 16 provides a connection to an associated activation button 118.

The measurement probe also comprises an authentication module 113 comprising an authentication device 112 and a memory 114. The memory 114 stores a secret key in a permanent memory portion 114a and also includes a rewritable portion 114b for storing a trigger count value. In use, the deactivation unit 10 only permits normal measurement probe operation when the trigger count value stored in the rewritable memory portion 114b is non-zero. Each time a trigger signal is generated, the count stored in the rewritable memory portion 114b is decremented accordingly. Once the stored trigger count value reaches zero, normal measurement probe operation is inhibited by the deactivation unit 10.

In order to reactivate the measurement probe, an activation button 118 storing a non-zero trigger count is placed in contact with the electrical contact pad 16. The above described authentication process is then used to ensure that both the measurement probe and the activation button contain the same secret key. Once authenticity has been established, trigger counts are transferred or loaded from the activation button to the measurement probe. In other words, the trigger count stored in the rewritable memory of the activation button is decremented by a certain value and, at substantially the same time, the trigger count value held in the rewritable memory portion 114b is increased by that value. Following the loading of trigger counts, the activation button can be removed from the measurement probe. In this manner, trigger count credits are transferred in bulk from the activation button 18 to the measurement probe 100 thereby allowing continued operation of the measurement probe until the new trigger count is expended.

The measurement probe 100 may be configured to take all the trigger counts that are stored in the activation button 118. Alternatively, the measurement probe 100 may be configured to take fewer trigger counts than are stored in the activation button. If necessary, the transfer of trigger counts may also be performed in the opposite direction. For example, trigger counts may be transferred from the measurement probe 100 back to an activation button 118. Alternatively, the activation button 118 may be arranged such that the trigger count can only ever be decremented. It should also be noted that the activation button 118 may be identical to the activation button 18 and hence may also be used with the measurement probe 2 described with reference to FIG. 1.

The activation button described above is designed to be brought into physical contact with corresponding electrical contact pads of the measurement probe. As mentioned above, activation buttons are simply one way of implementing the invention and many different types of secure technologies (smart cards etc) could be connected to the measurement probe and used for the same purpose. Furthermore, if the measurement probe itself is capable of securely storing trigger count values, additional methods of refreshing the trigger counts stored in the measurement probe can be implemented.

Figure 8:
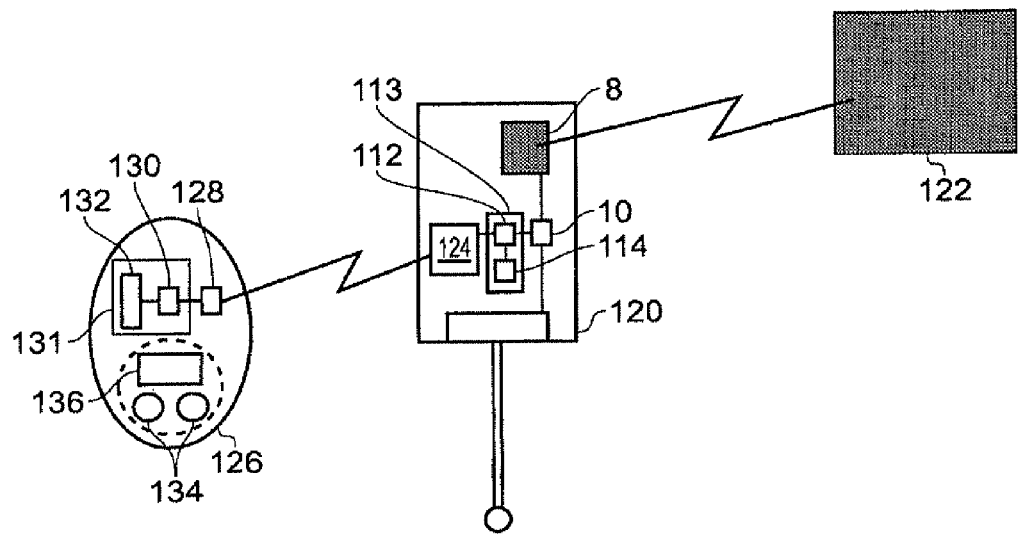
FIG. 8 shows a measurement probe and an associated activation fob.

Referring to FIG. 8, a further measurement probe 120 is shown. The measurement probe 120 includes a wireless communications unit 8 for passing trigger information to a remote probe interface 122 over a wireless RF link. The RF link may be as described previously in WO2004/57552 or may be arranged to implement an authentication process as described above with reference to FIG. 4. The measurement probe 120 also includes a further wireless communications unit 124 that is connected to an authentication module 113 that comprises an authentication device 112 and a secure memory 114. The physical electrical contact pad 16 of the measurement probe 100 described with reference to FIG. 7 is thus replaced in the measurement probe 120 by the wireless communications unit 124.

A separate fob 126 is also provided that includes a wireless communications unit 128 for communicating with the wireless communications unit 124 of the measurement probe 120. The communications unit 128 of the fob 126 is linked to an authentication module 131 comprising an authentication device 130 and an electronic memory 132 having a secure portion for storing the secret key and a rewritable portion for storing a trigger count value. The fob also includes a plurality of keys 134 that allow a user to control the transmission process. A liquid crystal display 136 is provided for displaying fob status information such as the number of trigger counts remaining and/or the number of counts to be loaded into the measurement probe.

In use, a user selects the number of trigger counts that are to be uploaded to a measurement probe using the keys 134. The fob is then placed in the vicinity of the relevant measurement probe 120 and a key is pressed to initiate the trigger count upload. The challenge-response authentication process is performed over the wireless link to verify that the fob 126 and the measurement probe 120 are authentic. After a successful authentication step, the selected number of trigger counts are transferred from the memory 132 of the fob 126 to the memory 114 of the measurement probe. The use of a wireless link means that the measurement probe 120 does not have to include accessible electrical contacts; the count stored by the measurement probe 120 can thus be updated without having to touch or in any way access the measurement probe.

To ensure that the probe triggers are uploaded to the desired measurement probe, it is preferred that the RF communications link between the fob 126 and the measurement probe 120 is a relatively short range link (e.g. operable only over distances of less than 20 cm or so). Alternatively, an optical link may be used instead of the RF link. If an optical link is provided, the directionality of the transmitted light can be used to ensure that trigger counts are uploaded to the correct probe. Although separate communications units are shown for communicating with the probe interface and the fob, it should also be noted that a single wireless communications unit may be used to perform both functions.

Although a dedicated fob 126 is described, the measurement probe may be interfaced with a general purpose computer (e.g. a laptop or PDA) via a standard wireless communications link (e.g. Wi-Fi, Bluetooth etc) or a wired link (USB, Firewire etc). In such an embodiment, the computer may also be interfaced to an encryption module or card that runs the authentication check, securely stores the secret key and maintains a probe trigger count value. In other words, an activation button or chip type device may be provided that communicates with the measurement probe via an intermediate (general purpose) device.

Figure 9:
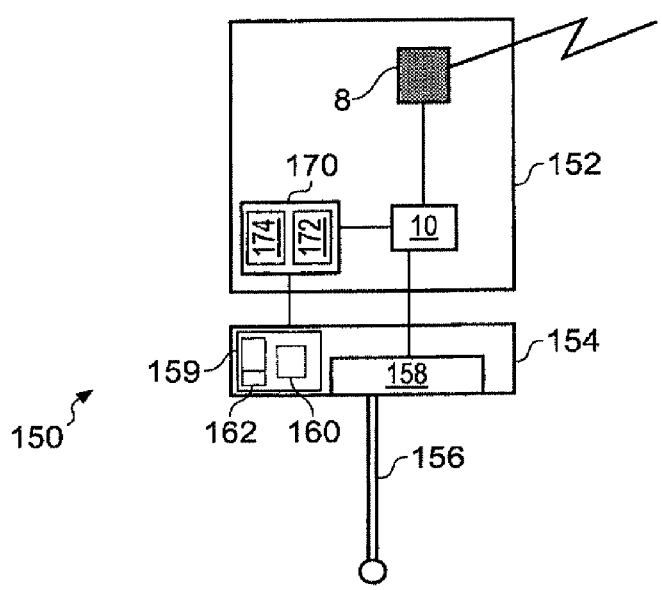
FIG. 9 illustrates two-part measurement probe apparatus.

Referring to FIG. 9, a two-part measurement probe 150 will now be described. The measurement probe comprises an upper part 152 and a lower part 154. The lower part 154 comprises a stylus 156 attached to a deflection measurement unit 158. The lower part 154 also includes an authentication module 159 comprising an authentication device 160 and an associated memory 162. The memory 162 comprises a secure portion for storing a secret key and a rewritable portion for storing a trigger count value. The upper part 152 comprises a wireless communications unit 8 for communicating with an associated probe interface (not shown) and a deactivation device 10 for inhibiting normal operation. The upper part also includes an authentication module 170 comprising an authentication device 172 and a memory portion 174 for storing a secret key.

The upper and lower parts may be assembled to form a measurement probe. Once assembled, electrical links are provided between the upper and lower parts by appropriate sets of electrodes (not shown). After assembly, a challenge and response authentication process of the type described above is performed in order to verify that the upper and lower parts of the device are authentic. If authenticity is confirmed, the deactivation device 10 allows trigger events from measurement unit 158 to be output via the wireless communications unit 8 provided that there are still trigger counts stored in the memory 162 of the lower part. Each trigger event decrements the stored count and when the trigger count value equals to zero, the deactivation device 10 of the upper part 152 prevents further operation with that particular lower part 154 attached. The lower part is then discarded and replaced with a new lower part (i.e. a lower part having stored trigger counts).

The lower part 152 can thus be considered as the combination of an activation button to store a trigger count and the (moving) mechanical parts of the measurement probe. All the moving parts that will wear with use are thus contained in the (disposable) lower part of the measurement probe, whereas the bulk of the (expensive) electronics are contained in the re-usable upper part. The number of trigger counts initially stored in the memory of the lower part may correspond to, or be slightly less than, the expected operational lifetime of the stylus or deflection measurement unit 158. In other words, the lower part may store a trigger count value that causes operation of the measurement probe to cease before the measurement probe fails or its measurement accuracy decreases to unacceptable levels. In this manner, the accuracy of measurements from the two-part measurement probe system can be assured.

The above embodiments use an authentication process which offers a high level of flexibility in that any authentic components can be used in combination. For example, trigger count credits stored by activation buttons can be transferred to any number of authentic measurement probe. This has the advantage of allowing activation buttons to be swapped between different measurement probes as required. Although such flexibility in using trigger counts is advantageous, it may be desirable to provide non-transferable trigger counts in certain circumstances.

Figure 10:
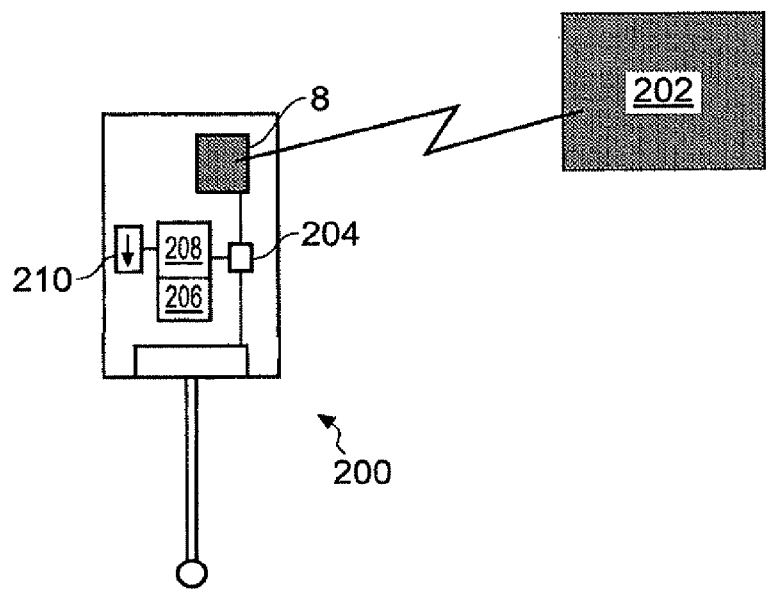
FIG. 10 shows a measurement probe storing a plurality of trigger count release codes.

Referring to FIG. 10 an alternative measurement probe 200 is illustrated. The measurement probe 200 comprises a wireless (RF) communications unit 8 for transmitting data to a remote probe interface 202. In addition, a deactivation device 204 is provided to stop normal measurement probe operation when the trigger counts stored in a rewritable memory portion 206 are expended. The measurement probe also includes a secure memory portion 208 that securely stores a number of (secret) pre-programmed codes for releasing further trigger counts. Entering a code that matches a stored code will thus increase the stored trigger count by a certain amount. These release codes are known only to the manufacturer and are sufficiently complex to ensure that it is not practically possible to find such codes by a trial and error process. The codes are also unique to the particular measurement probe; the measurement probe being identifiable by a unique probe identification or serial number.

The measurement probe 200 is thus supplied with a certain number (e.g. five or ten thousand) of trigger counts already stored in its rewritable memory. The stored trigger count reduces with probe use in the manner described above. When the trigger count reaches, or approaches, zero an appropriate release code can be acquired from the manufacturer. Entry of a release code that matches a stored code causes the release of further trigger counts thereby permitting continued operation of the apparatus. Each release code can only be used once to increase the trigger count.

The measurement probe 200 also comprises an interface 210 via which the release codes can be input. The interface may comprise one or more keys into which a code is typed. Alternatively, the interface may comprise a wireless link to a remote device (such as a fob) into which the appropriate code has been entered. Alternatively, the interface may receive data via a stylus deflection data entry process such as the trigger logic technique described previously in U.S. Pat. No. 7,145,468. Alternatively, the interface may establish a link (e.g. by telephone or over the interne) to a computer server of an authentic manufacturer, distributor or retailer etc. On receipt of appropriate payment, the necessary code may then be passed over the link to the measurement probe thereby reactivating the measurement probe.

It should also be noted that measurement probes may be provided in which the secure memory portion storing the trigger count can not be accessed after manufacture. In such a case, the measurement probe will only work for the preset number of triggers before becoming permanently inoperable. The probe may then be disposed of, or returned to the manufacturer for refurbishment. Although the above examples describe topping up a trigger count value, it is also possible for the measurement probe to be switched into a permanent (i.e. not trigger count or time limited) mode of operation. For example, an activation button or release code may be provided that permanently deactivates the deactivation device such that the measurement probe operates from that point forward as a standard measurement probe.

The above described embodiments all relate to measurement probe apparatus. It is, however, important to note that the same techniques could be applied to a wide range of other measurement apparatus. For example, the technique may be applied to any dimensional measuring apparatus such as position encoder systems, co-ordinate measuring machines, scanning apparatus etc. The techniques may also be used with non-dimensional measuring apparatus such as spectroscopy kits.

Figure 11:
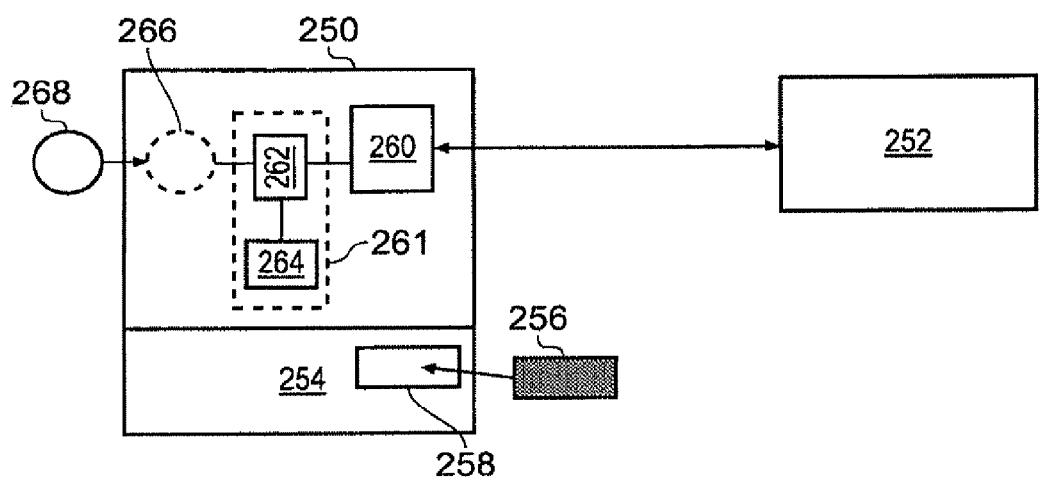
FIG. 11 illustrates application of the invention to non-dimensional measurement apparatus.

Referring to FIG. 11, a Raman spectroscopy system is illustrated in which a Raman spectrometer 250 is interfaced to a computer 252. The spectrometer 250 comprises a measurement unit 254 that is arranged to acquire, under the control of the computer 252, Raman spectra from samples 256 placed on a sample stage 258. The spectrometer 250 also comprises a deactivation device 260 that can prevent measurement data being passed to the computer 252. The deactivation device 260 is linked to an authentication module 261 comprising an authentication device 262 and a secure memory 264 in which a secret key is held. An electrical contact pad 266 for receiving an activation button 268 is also provided. The activation button 268 may be the same as that described with reference to FIG. 2, with the stored count value relating to measurement counts rather than trigger counts.

In use, the activation button 268 storing a number of measurement counts is placed on the electrical contact pad 266. In the manner described above, the authentication module 261 of the spectrometer communicates with the corresponding authentication module of the activation button 268. If the activation button 268 is found to be authentic and also holds a non-zero measurement count, the deactivation unit 260 allows normal spectrometer operation. If the activation button 268 is not authentic, or if it hold no measurement counts, the deactivation device 260 prevents normal spectrometer operation. In this manner, a spectrometer can be provided which can perform a certain number of measurements before a replacement activation button is required. The number of counts provided on an activation button may be linked to the number of measurements that can be taken before recalibration or servicing of the device is necessary, thereby ensuring operation does not occur when the spectrometer may be out of calibration. As described above, a variant of the apparatus may be provided in which measurement counts are uploaded to a secure memory store within the spectrometer.

It should be noted that herein the term "authentic" is used to describe devices that store the relevant secret key and does not necessarily relate to the origin of the manufactured device. In particular, the authentication process may allow only certain models of measurement probe to be paired with certain models of interface thereby preventing measurement probes and interfaces that are not designed to be operable with one another being used in combination.

It should also be remembered that the examples described above with reference to the associated drawings are only examples of the present invention. A skilled person would be aware of the many alternatives and variations of the above examples that would be possible. In particular, the various authentication modules, authentication devices, electronic memories etc described above are illustrated as separate functional blocks. These functions may be provided by discrete chips or circuits or may be implemented as parts of a computer program running on a general purpose computing module. The above examples should thus be seen as in no way limiting the physical manner in which the invention is implemented.

What is claimed is:

1. Dimensional measurement apparatus for use with a machine tool or co-ordinate measuring machine, comprising:
a measurement probe comprising a measurement portion having a deflectable stylus for acquiring object position measurements;
an output portion for outputting measurement data relating to the acquired object position measurements to a machine controller of the machine tool or co-ordinate measuring machine, the machine controller using the measurement data in combination with machine position information to measure a dimension of an object; and
a deactivation portion for inhibiting normal operation of the measurement apparatus such that output of the measurement data to the machine controller is prevented;
wherein the deactivation portion, in use, reads apparatus usage information from an apparatus usage module and inhibits normal operation of the dimensional measurement apparatus if said apparatus usage information fails to meet one or more predetermined criteria, the apparatus usage information providing a measure of the amount of dimensional measurement apparatus usage.

2. An apparatus according to claim 1, wherein the deactivation portion can update apparatus usage information stored by the apparatus usage module.

3. An apparatus according to claim 1, in which the apparatus usage information comprises a measurement count value relating to the number of object measurements, wherein the apparatus usage module comprises a memory for storing said measurement count value.

4. An apparatus according to claim 3, wherein the measurement count value stored in the memory of the apparatus usage module is decremented for each object measurement acquired by the measurement apparatus and the one or more predetermined criteria are met if the measurement count value is greater than zero.

5. An apparatus according to claim 1, in which the apparatus usage information comprises information relating to a length of time of apparatus operation.

6. An apparatus according to claim 1, comprising an integral apparatus usage module.

7. An apparatus according to claim 1, comprising an interface for communicating with an associated unit, wherein the associated unit comprises the apparatus usage module.

8. An apparatus according to claim 7, comprising an authentication module for verifying the authenticity of an associated unit.

9. An apparatus according to claim 7, wherein the interface comprises one or more electrical contacts and the associated unit comprises one or more complementary electrical contacts, wherein an electrical connection can be provided between the interface and the associated unit by connecting the one or more electrical contacts with the one or more complementary electrical contacts.

10. An apparatus according to claim 7, wherein the interface comprises a wireless communications unit, whereby a wireless link can be established between the measurement apparatus and the associated unit.

11. An apparatus according to claim 1, wherein the deactivation portion is permanently disabled on receipt of a total release code thereby allowing ongoing normal operation of the measurement apparatus.

12. An apparatus according to claim 1, comprising a measurement device that comprises the measurement portion, the output portion and the deactivation portion, wherein the output portion comprises a wireless transmitter for transmitting measurement data to a remote interface and said deactivation portion inhibits output of the measurement data by deactivating said wireless transmitter.

13. An apparatus according to claim 1, comprising a measurement device linked to an interface, the measurement device including the measurement portion and the interface including the output portion, wherein the deactivation portion inhibits normal operation of the apparatus by preventing output of measurement data from the output portion of the interface.

14. An apparatus according to claim 1, wherein the measurement portion is a touch trigger probe that issues a trigger signal whenever a stylus deflection of the deflectable stylus exceeds a threshold.

15. A method of operating a dimensional measurement apparatus with a machine tool or co-ordinate measuring machine, the measurement apparatus comprising a measurement probe having a measurement portion for acquiring object position measurements, the method comprising the steps of:
(i) using the measurement probe of the measurement apparatus to acquire object position measurements, the measurement probe including a deflectable stylus; and
(ii) outputting measurement data from the measurement apparatus that is related to the position measurements acquired in step (i), including outputting the measurement data to a machine controller of the machine tool or co-ordinate measuring machine; and
(iii) the machine controller using the measurement data in combination with machine position data to measure a dimension of an object,
wherein the method comprises performing the step of reading apparatus usage information and only performing step (ii) if said apparatus usage information meets one or more predetermined criteria.

16. A measurement device for use with a machine tool or co-ordinate measuring machine comprising:
a measurement portion having a deflectable stylus for acquiring object measurements;
an output portion for outputting measurement data relating to the acquired object measurements to a machine controller of the machine tool or co-ordinate measuring machine, the machine controller using the measurement data in combination with machine position information to measure a dimension of an object; and
a device disabler for inhibiting normal operation of the measurement device such that output of the measurement data is prevented;
wherein the device disabler inhibits operation of the measurement device after an occurrence of a predetermined event and only permits continued operation of the measurement device, including continued operation of a previously used measurement portion, on receipt of an appropriate reactivation instruction.

17. A measurement device according to claim 16, wherein the predetermined event comprises a certain amount of usage of the measurement device.

* * * * *